May 24, 1966 R. T. ROGERS ETAL 3,253,186
FLASHER CIRCUIT
Filed Jan. 21, 1964
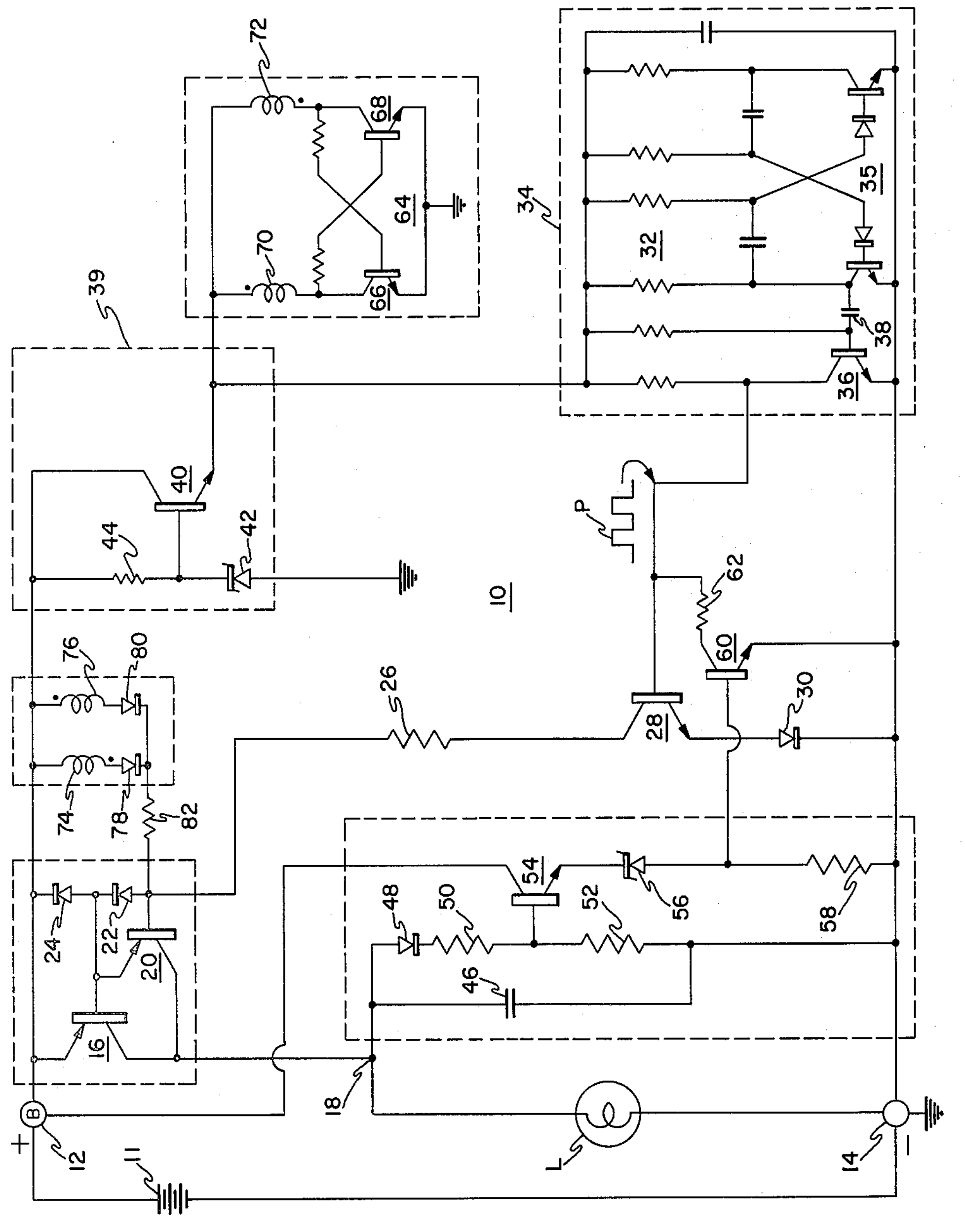
INVENTORS
ROLAND T. ROGERS
JAMES L. HUDSON
BY Kenneth E. Forman
ATTORNEY

United States Patent Office 3,253,186

Patented May 24, 1966

3,253,186
FLASHER CIRCUIT

Roland T. Rogers, Butler, and James L. Hudson, Cranford, N.J., assignors to Elastic Stop Nut Corporation of America, Union, N.J., a corporation of New Jersey Filed Jan. 21, 1964, Ser. No. 339,282
8 Claims. (Cl. 315—209)

This invention relates generally to regulated power supplies, and more particularly to an improved flasher circuit for providing a substantially constant output voltage to a load and for limiting the leakage current through an intermittently operated transistor switch between the input voltage and the load. The flasher circuit of the present invention is particularly useful for operating signal lamps for marine and aviation guidance equipment.

It has been the practice to provide flasher circuits for signal lamps with a self-contained voltage source, such as a battery. Since some flasher circuit and signal lamp installations are in relatively inaccessible locations, it is important and desirable that the flasher circuit be efficient and reliable so that it will operate as long as possible with a minimum of attention and maintenance. Transistorized flasher circuits, especially those for marine use, operate over a relatively wide range of temperatures. Since there are always leakage currents ($I_{ebo}$ and $I_{cbo}$) through the transistor switches when the latter is not conducting there is an unwanted drain on the voltage source even when the flasher lamp is off. While these leakage currents can be tolerated at relatively low temperatures of operation, the leakage currents increase to intolerable proportions at relatively higher temperatures, doubling in value approximately every 12 degrees C. Unless some means are taken to control these leakage currents, the voltage source (battery) may be discharged at a relatively high undesirable rate on very hot days.

It is an object of the present invention to provide an improved circuit for operating a load intermittently and efficiently with a substantially constant voltage.

Another object of the present invention is to provide an improved flasher circuit having means to control leakage currents through a switching transistor to safe and efficient levels.

A further object of the present invention is to provide a flasher circuit of the type described wherein current is supplied to a load through an intermittently operated switching transistor whose leakage currents are controlled over a relatively wide range of temperatures.

Still a further object of the present invention is to provide an improved flasher circuit of the type described that is relatively simple in structure and operation and yet highly efficient in use.

Briefly, these and other objects of the present invention are achieved in a flasher circuit wherein the emitter-collector path of a switching transistor is connected between a source of unidirectional voltage and a signal lamp, the load. Means are provided to trigger the switching transistor on and off periodically. The voltage across the load is monitored and means are provided to interrupt the current through the switching transistor when the voltage across the load reaches a predetermined value. A Zener diode in the last-mentioned means breaks down when the voltage across the load reaches the desired value and cuts off the emitter base current to the switching transistor, rendering it inoperative. With the switching transistor inoperative, the voltage across the Zener diode decreases until it ceases to conduct and the switching transistor is rendered conductive again if the triggering means are present. This action continues as long as a triggering pulse is present.

Leakage currents through the switching transistor are controlled by back biasing the transistor with a relatively small voltage. The back-biasing voltage is derived from the original single source of voltage. An oscillator circuit is provided to convert a portion of the original voltage to an A.-C. voltage. The A.-C. voltage is stepped down by a transformer, rectified and applied between the base and the emitter-collector path of the switching transistor to back bias the latter with a D.-C. voltage that opposes the leakage current.

The novel features of the present invention, as well as the invention itself, both as to its organization and method of operation will be understood in detail from the following description, when considered in connection with the accompanying drawing, the single figure of which is a schematic diagram of the improved flasher circuit of the present invention.

Referring now to the drawing, there is shown a flasher circuit 10 for providing a substantially constant voltage to a load, such as a signal lamp L. The lamp L may be a signal lamp of the type used in marine and/or aviation warning systems and may require 12 volts for proper operation, for example. A suitable source of input voltage to the circuit 10 may be a battery 11, such as an eighteen volt battery, whose positive terminal is connected to an input terminal 12 and whose negative terminal is connected to an input terminal 14. The terminal 14 is connected to a common connection, such as ground.

A PNP switching transistor 16 is connected between the voltage source and the lamp L to provide current intermittently for the lamp L. The emitter of the switching transistor 16 is connected to the input terminal 12 and the collector of the switching transistor 16 is connected to one terminal 18 of the lamp L. The other terminal of the lamp L is connected to the grounded terminal 14.

A PNP driving transistor 20 for the switching transistor 16 has its emitter-collector path connected between the base and the collector of the transistor 16. The base of the transistor 20 is connected to the base of the transistor 16 through a biasing diode 22, and the base of the transistor 16 is connected to the emitter of the transistor 16 through a biasing diode 24, the diodes 22 and 24 being poled in a direction to back bias the transistors 20 and 16, respectively, in a manner to be described hereinafter in detail.

The base of the transistor 20 is also connected to the grounded terminal 14 through a resistor 26, the emitter-collector path of an NPN transistor 28 and a diode 30, the cathode of the diode 30 being connected to the grounded terminal 14, and the emitter of the transistor 28 being connected to the anode of the diode 30.

Means are provided to switch the switching transistor 16 on and off periodically. To this end, a timing circuit 32, within the dashed rectangle 34, is adapted to provide a series of positive-going pulses P for application to the base of the transistor 28 to furnish base drive for the transistors 16 and 20.

The timing circuit 32 is a free running multivibrator circuit 35 of a type well known in the art, comprising a pair of cross-coupled NPN transistors and providing a square-wave output coupled to the base of an output transistor 36 through a capacitor 38.

The timing circuit 32 is energized from the battery 11 through a regulating circuit shown within the dashed rectangle 39. The positive input terminal 12 is connected to the input of the timing circuit 32 through the emitter-collector path of a transistor 40. The grounded terminal 14 is also connected to the input of the timing circuit 32. The base of the transistor 40 is connected to the common terminal, ground, through a Zener diode 42, the cathode of the Zener diode 42 being connected to the collector of the transistor 40 through a resistor 44. The constant voltage across the conducting Zener diode 42 provides a constant bias for the transistor 40, thereby providing a substantially constant output voltage for the timing circuit 32.

The output of the timing circuit 32 is between the collector of the transistor 36 and the common connection, ground. The collector of the transistor 36 is connected to the base of the transistor 28 to apply positive-going pulses P thereto periodically to cause the transistors 20 and 16 to become conductive periodically.

When current flows through the switching transistor 16 to the lamp L, current also charges a capacitor 46 connected across the lamp L. A serially connected voltage divider, comprising a diode 48 and resistors 50 and 52 is connected across the capacitor 46. The common connection between the resistors 50 and 52 is connected to the base of an NPN transistor 54, and the emitter-collector path of the transistor 54 is connected to the grounded input terminal 14 through a Zener diode 56 and a resistor 48. The collector of the transistor 54 is connected to the source of input voltage, that is, to the positive terminal of the battery 11, and the emitter of the transistor 54 is connected to the cathode of the Zener diode 56. The break-down voltage of the Zener diode 56 is chosen to be that which will cause the Zener diode 56 to begin conducting when the voltage across the lamp L and the capacitor 46 is a predetermined voltage, say 12 volts, for example.

Means are provided to maintain the voltage across the lamp L substantially constant. To this end, there is provided an NPN transistor 60 whose base is connected to the junction between the Zener diode 56 and the resistor 58. The collector of the transistor 60 is connected to the base of the transistor 28 through a resistor 62, and the emitter of the transistor 60 is connected to the grounded terminal 14.

The operation of the flasher circuit 10 will now be explained: Let it be assumed that the transistors 16, 20, 28, 54 and 60 are not conducting and that the lamp L is not lighted. When a postive-going pulse P from the timing circuit 32 is applied to the base of the transistor 28, the latter becomes conductive and current begins to flow in the emitter-base paths of the transistors 20 and 16, turning these transistors on also. Current now flows through the emitter-collector paths of the transistors 16 and 20 to the lamp L and to the capacitor 46. The capacitor 46 becomes charged and the lamp L lights. As soon as the voltage across the lamp L and the capacitor 46 reaches a predetermined voltage, say 12 volts, for example, the voltage at the base of the transistor 54 is sufficient to cause the Zener diode 56 to break down. Current now flows through the transistor 54. This action causes the voltage across the resistor 58 at the base of the transistor 60 to increase, and the transistor 60 becomes conductive. Current through the emitter-collector path of the transistor 60 decreases the base bias of the transistor 28 and causes it to cease conducting, turning off transistors 20 and 16. Current now ceases to flow to the lamp L and the capacitor 46, and the voltage across the lamp L and the capacitor 46 begins to decrease. A very slight drop in voltage across the capacitor 46 now causes the Zener diode 56 to cease conducting, decreasing the bias on the transistor 60 and turning the latter transistor off. The transistor 28 can now conduct again, provided the pulse P from the timing circuit 32 is still applied to its base. The transistors 20 and 16 become conductive once more and provide the lamp L and capacitor 46 with current.

The intermittent operation of the switching transistor 16, as described above, may take place many times during the application of a single positive-going pulse P to the base of the transistor 28 and causes the capacitor 46 to maintain a substantially constant voltage, the latter voltage being maintained within plus or minus 0.1 volt. Since the lamp L has a high thermal lag, it can emit a substanstantially constant beam of light under these conditions. When the positive-going pulse P is removed from the base of the transistor 28, the switching and driving transistors 16 and 20 are turned off, base drive being removed, and the lamp L is extinguished.

Even in the absence of a trigger pulse P to the base of the transistor 20, that is, even when the transistors 16 and 20 are not conducting, leakage currents (I*ebo* and I*cbo*) flow in the emitter-base and emitter-collector paths of the transistors 16 and 20. Since these leakage currents are a drain on the single voltage source, battery 11, being especially heavy at elevated temperatures, it is desirable to reduce them.

In accordance with the present invention, means are provided to back bias the transistors 20 and 16 by voltage across the diodes 22 and 24, respectively, the latter voltages being derived from the single source of input voltage between the input terminals 12 and 14. To this end, the constant voltage from the voltage regulator, within the dashed rectangle 39, is applied across an oscillator circuit, such as a multivibrator circuit 64. The multivibrator circuit 64 comprises a pair of cross-coupled NPN transistors 66 and 68 connected in a manner well known in the art to function as a free running multivibrator.

The collector load of the transistor 66 is a primary winding 70 and the collector load and the transistor 68 is a primary winding 72. The primary windings 70 and 72 are windings on a transformer and are inductively coupled to secondary windings 74 and 76, respectively. Each of the secondary windings 74 and 76 has one end connected to the emitter of the transistor 16. The other ends of the secondary windings 74 and 76 are connected to the base of the transistor 20 through diodes 78 and 80, respectively, and a resistor 82.

In operation, the free running multivibrator 64 produces square-wave pulses across the primary windings 70 and 72 that are out of phase with each other. The out of phase, transformed pulses across the secondary windings 74 and 76 are rectified by the diodes 78 and 80, respectively, to provide a full-wave rectified voltage across the diodes 22 and 24. The voltage across the biasing diode 22 is in a direction to back bias the driving transistor 20 to oppose the emitter-base leakage currents through the transistor 20. The voltage across the biasing diode 24 is in a direction to back bias the switching transistor 16 to oppose leakage currents through the emitter-base path of the transistor 16. Since collector current is the emitter-base current multiplied by the (beta) gain of the transistor, reducing the emitter-base leakage currents also reduces the leakage currents at the collectors of the transistors 16 and 20. Thus, a portion of the single voltage source battery 11 is chopped, transformed, rectified, and applied to the transistors 20 and 16 through biasing diodes 22 and 24, respectively, to back bias them in a manner to reduce leakage currents from flowing in the absence of triggering pulses to their bases.

Thus, there has been described herein a flasher circuit for operating a lamp intermittently with a substantially constant voltage and for providing a back biasing voltage for the switching and driving transistors to oppose leakage currents. While only one embodiment of the flasher circuit has been described, variations in the flasher circuit within the scope of the present invention will, no doubt, suggest themselves to those skilled in the art. Hence, it is desired that the foregoing shall be considered as illustrative, and not in a limiting sense.

What we claim is:

1. In a circuit of the type wherein current from a source of D.-C. voltage is applied to a load through the emitter-collector path of an intermittently operated transistor having a base, an emitter and a collector:

(a) means to control leakage currents through said transistor comprising an oscillator circuit, (b) a transformer having a pair of inductively coupled windings, (c) means to energize said oscillator circuit from said source of D.-C. voltage through one of said pair of windings of said transformer to cause said oscillator circuit to oscillate and to provide an alternating voltage across said one winding, (d) a rectifier, (e) means connecting the other of said pair of windings and said rectifier in a series circuit between said base and said emitter of said transistor in a direction such that said series circuit serves to back bias said transistor, and (f) a diode connected between said base and said emitter in a direction such that the current flow through said diode opposes that from said source of D.-C. voltage.

2. In a circuit of the type wherein current from a source of D.-C. voltage is applied to a load through the emitter-collector path of a switching transistor having a base, an emitter and a collector:

(a) a driving transistor having an emitter-collector path connected between said base and said emitter-collector path of said switching transistor, said driving transistor having a base, an emitter and a collector, (b) means to control leakage currents through said transistors comprising an oscillator circuit, (c) a transformer having inductively coupled primary and secondary windings, (d) means to energize said oscillator circuit from said source of voltage through said primary winding of said transformer to cause said oscillator circuit to oscillate and to provide an alternating voltage across said primary winding, (e) a rectifier, (f) said emitter of said driving transistor being connected to said base of said switching transistor, (g) means connecting said secondary winding and said rectifier in a series circuit to said base of said driving transistor and said emitter of said switching transistor in a direction such that said series circuit serves to back bias said transistors, (h) a first diode connected between said base and said emitter of said driving transistor in a direction such that the current flow through said first diode opposes that from said source of D.-C. voltage, and (i) a second diode connected between said base and said emitter of said switching transistor in a direction such that the current flow through said second diode opposes that from said source of D.-C. voltage.

3. In a circuit of the type wherein current from a single source of D.-C. voltage is applied to a load through the emitter-collector path of a transistor having a base, an emitter, and a collector:

(a) means to control leakage currents through said transistor comprising an oscillator circuit, (b) a transformer having first and second windings inductively coupled to each other, (c) means to energize said oscillator circuit from said source of D.-C. voltage through said first winding of said transformer to cause said oscillator circuit to oscillate and to provide an alternating voltage across said first winding, (d) a rectifier, (e) means connecting said second winding and said rectifier in series between said base and said emitter of said transistor in a direction to back bias said transistor, (f) a diode having a cathode and an anode, (g) means connecting said anode to said base, and (h) means connecting said cathode to said emitter.

4. A flasher circuit for supplying current to a load intermittently, said circuit comprising a switching transistor having an emitter-collector path and a base:

(a) means to apply a source of D.-C. voltage in series with said emitter-collector path and said load, (b) means to apply trigger pulses periodically to said base to cause said transistor to conduct periodically, (c) means to sense the voltage across said load and to interrupt current through said transistor when the voltage across said load is a predetermined voltage, (d) said last-mentioned means comprising means to cause said switching transistor to conduct when said voltage across said load tends to drop below said predetermined voltage, and (e) means energized by said source of voltage and including a diode connected between said base and the emitter of said transistor to back bias said transistor for opposing leakage currents when said transistor is not conducting.

5. A flasher circuit for supplying current to a load intermittently, said circuit comprising:

(a) a switching transistor having an emitter-collector path and a base, (b) means to apply a source of D.-C. voltage in series with said emitter-collector path and said load, (c) means to apply trigger pulses periodically to said base to cause said transistor to conduct periodically, (d) means to sense the voltage across said load, to interrupt current through said transistor when the voltage across said load is a predetermined voltage, and to cause said transistor to conduct when said voltage across said load tends to drop below said predetermined voltage during the application of one of said trigger pulses to said base, and (e) means including a diode connected between the base and the emitter of said transistor to back bias said transistor for opposing leakage currents when said transistor is not conducting, said last-mentioned means comprising means to convert said source of voltage to an A.-C. voltage, means to rectify said A.-C. voltage, means to isolate said rectified voltage from said source of D.-C. voltage, and means to apply said rectified voltage to said diode to produce a voltage drop across it in a direction to back bias said transistor.

6. A circuit for supplying a substantially constant voltage to a load from a source of unidirectional voltage, said source having a pair of output terminals, one of said pair of output terminals being connected to said load and comprising a common connection:

(a) a first transistor having an emitter-collector path and a base, and means connecting the other of said pair of output terminals to said load through said emitter-collector path of said first transistor, (b) a second transistor having an emitter-collector path and a base, (c) means connecting said emitter-collector path of said second transistor between said base of said first transistor and said common connection, (d) a voltage divider connected across said load, (e) a capacitor connected across said voltage divider, (f) a third transistor having an emitter-collector path and a base, (g) a Zener diode having a break-down voltage lower than said constant voltage, (h) means connecting said emitter-collector path of said third transistor and said Zener diode in series with each other and between said pair of output terminals of said voltage source, (i) means connecting said base of said third transistor to a point on said voltage divider, (j) a fourth transistor having an emitter-collector path and a base, (k) means connecting said emitter-collector path of said fourth transistor between said base of said second transistor and said common connection, (l) means connecting said base of said fourth transistor between said Zener diode and said common connection, (m) means to apply a source of trigger pulses to said base of said second transistor to cause said first and second transistors to conduct periodically, said third transistor being rendered conductive when said base of said third transistor acquires a voltage sufficient to cause said Zener diode to break down, said fourth transistor being rendered conductive when said Zener diode breaks down, and (n) said second transistor being rendered non-conductive when said fourth transistor becomes conductive.

7. A circuit for supplying a substantially constant D.-C. voltage to a load from a source of unidirectional voltage, said source having a pair of output terminals, one of said pair of output terminals being connected to said load and comprising a common connection:

(a) a first transistor having an emitter-collector path and a base, (b) means connecting the other of said pair of output terminals to said load through said emitter-collector path of said first transistor, (c) a second transistor having an emitter-collector path and a base, (d) means connecting said emitter-collector path of said second transistor between said base of said first transistor and said common connection, (e) a voltage divider connected across said load, (f) a capacitor connected across said voltage divider, (g) a third transistor having an emitter-collector path and a base, (h) a Zener diode having a break-down voltage lower than said constant voltage, (i) means connecting said emitter-collector path of said third transistor and said Zener diode in series with each other and between said pair of output terminals of said voltage source, (j) means connecting said base of said third transistor to a point on said voltage divider, (k) a fourth transistor having an emitter-collector path and a base, (l) means connecting said emitter-collector path of said fourth transistor between said base of said second transistor and said common connection, (m) means connecting said base of said fourth transistor between said Zener diode and said common connection, (n) means to apply a source of trigger pulses to said base of said second transistor to cause said first and second transistors to conduct periodically, said third transistor being rendered conductive when said base of said third transistor acquires a voltage sufficient to cause said Zener diode to break down, said fourth transistor being rendered conductive when said Zener diode breaks down, and said second transistor being rendered non-conductive when said fourth transistor becomes conductive, and (o) means energized by said source of unidirectional voltage and the emitter of said first transistor to back bias it, whereby to oppose leakage currents when said first transistor is not conducting.

8. A flasher circuit comprising:

(a) a source of D.-C. voltage having two terminals, (b) a switching transistor having an emitter, a collector and a base, (c) a lamp, (d) means connecting one of said terminals of said voltage source to said emitter, (e) means connecting said collector to the other of said terminals of said voltage source through said lamp, (f) a timing circuit having a trigger pulse output, (g) means connecting said timing circuit to said base to trigger said switching transistor on and off periodically, (h) means to sense the voltage across said lamp, (i) regulating means coupled to said base to cause said switching transistor to cease conducting when the voltage across said lamp reaches a predetermined voltage during the application of a trigger pulse to said base of said switching transistor, and (j) means connected between said emitter and said base of said switching transistor and energized by said source of voltage to back bias said switching transistor in the absence of a trigger pulse to said base, whereby to oppose leakage currents through said switching transistor.

No references cited.

JOHN W. HUCKERT, *Primary Examiner.*

D. O. KRAFT, *Assistant Examiner.*